United States Patent
Yin et al.

(10) Patent No.: US 9,888,482 B2
(45) Date of Patent: Feb. 6, 2018

(54) CHANNEL BANDWIDTH SWITCHING METHOD AND NETWORK EQUIPMENT

(71) Applicant: Huawei Technologies Co., Ltd., Shenzhen (CN)

(72) Inventors: Jixiong Yin, Chengdu (CN); Guixue Zhao, Chengdu (CN); Xinshi Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 181 days.

(21) Appl. No.: 15/067,773

(22) Filed: Mar. 11, 2016

(65) Prior Publication Data

US 2016/0198478 A1 Jul. 7, 2016

Related U.S. Application Data

(63) Continuation of application No. PCT/CN2013/083451, filed on Sep. 13, 2013.

(51) Int. Cl.
*G01R 31/08* (2006.01)
*H04W 72/08* (2009.01)
*H04L 1/00* (2006.01)
*H04L 1/20* (2006.01)
*H04W 72/04* (2009.01)

(52) U.S. Cl.
CPC ......... *H04W 72/082* (2013.01); *H04L 1/0025* (2013.01); *H04L 1/203* (2013.01); *H04W 72/0453* (2013.01)

(58) Field of Classification Search
USPC ....................... 370/203, 252, 329
See application file for complete search history.

(56) References Cited

U.S. PATENT DOCUMENTS

| 7,545,867 | B1 | 6/2009 | Lou et al. |
| 2011/0170419 | A1 | 7/2011 | Zhang et al. |
| 2012/0155263 | A1 | 6/2012 | Long |
| 2015/0341274 | A1 | 11/2015 | Long |

FOREIGN PATENT DOCUMENTS

| CN | 101631363 A | 1/2010 |
| CN | 101646207 A | 2/2010 |
| CN | 101777964 A | 7/2010 |
| CN | 101808368 B | 10/2012 |
| CN | 103222218 B | 11/2015 |
| EP | 2 922 260 B1 | 7/2016 |
| WO | WO 2012/166648 A1 | 12/2012 |

*Primary Examiner* — Phuongchau Ba Nguyen

(57) ABSTRACT

Embodiments of the present invention provide a channel bandwidth switching method and network equipment. In the method, an MSE is acquired; a target bandwidth of a first space link is acquired according to the MSE and a correspondence between the target bandwidth of the space link and the MSE; in a case in which the signal has an interfering signal outside the operating bandwidth, the interfering signal is acquired; it is determined, according to the interfering signal and an error-free threshold, whether the operating bandwidth can be switched to the target bandwidth of the first space link; and if it is determined that the operating bandwidth can be switched to the target bandwidth of the first space link, information that carries the target bandwidth of the first space link is sent to the second network element, thereby avoiding a problem such as interruption of signal transmission.

14 Claims, 6 Drawing Sheets

CHANNEL BANDWIDTH SWITCHING METHOD AND NETWORK EQUIPMENT

CROSS-REFERENCE TO RELATED APPLICATIONS

This application is a continuation of International Application No. PCT/CN2013/083451, filed on Sep. 13, 2013, which is hereby incorporated by reference in its entirety.

TECHNICAL FIELD

The present invention relates to the field of communications, and in particular, to a channel bandwidth switching method and network equipment.

BACKGROUND

For a microwave transmission system, link availability is an important indicator for measuring link quality, where the availability refers to a percentage of remaining available time except unavailable time (in situations, such as a severe bit error and interruption of a link, which are caused because of channel deterioration, an equipment fault, human intervention, or other reasons) in total operating time of equipment. In an actual application, the link availability is affected by factors such as a weather change, or interference from an external signal. The availability is generally required to be greater than 99.99% in the microwave system.

In a current microwave transmission system, an adaptive modulation (Adaptive Modulation, AM) mode or an adaptive channel bandwidth (Adaptive Channel bandwidth, ACB) adjustment technology is a relatively frequently used method for improving link availability. When signal quality of a microwave link deteriorates, transmission capacity is reduced by reducing a sending modulation mode order, for example, 32 quadrature amplitude modulation (Quadrature Amplitude Modulation, QAM) is switched to 16QAM, or a channel bandwidth such as 250 M is switched to 125 M, so as to improve interference immunity of the system, and ensure stable service transmission, thereby improving the link availability. When the signal quality of the microwave link is desirable, the transmission capacity is improved by increasing a sending modulation mode order, for example, 16QAM is switched to 32QAM, or a channel bandwidth such as 125 M is switched to 250 M; however, interruption of the link may also be caused because decoding cannot be performed, and in this case, the link availability is affected.

As shown in FIG. 1, network equipment (Network Equipment, NE) includes a Tx Path module, an ACB Engine module, an Rx Path module, where the Tx Path/Rx Path module is configured to receive and send data, and calculate a mean square error (Mean Square Error, MSE) that identifies channel quality of a space link from a network element NE2 to a network element NE1, and the ACB Engine module is configured to monitor MSE information, and control the Tx Path/Rx Path module to perform bandwidth switching.

The network element NE1 is connected to the network element NE2, a link from NE2 to NE1 is Link A, and a link from NE1 to NE2 is Link B, where the Link A currently operates in a bandwidth of 250 M. The ACB Engine module of the network element NE1 monitors an MSE that reflects channel quality of the Link A and that is calculated by the Rx Path module, and obtains, according to the MSE and an MSE threshold for switching a target bandwidth, that the Link A may operate in a bandwidth of 500 M. The ACM Engine module sends, from the Link B through a channel provided by the Tx Path module, information that carries the target bandwidth, that is, a message about an adaptive channel bandwidth (Adaptive Channel bandwidth, ACB) of 500 M to the network element NE2. The ACM Engine module of the network element NE2 receives the information, which is sent by the network element NE1, about the target bandwidth of the Link A, and controls the Tx Path module of the NE2 and the Rx Path module of the NE1 to jointly complete switching of the Link A to the target bandwidth.

An operating bandwidth of the network element NE1 is 250 M. It is assumed that an interfering signal exists in a frequency domain range from a frequency band of 250 M to a frequency band of 500 M, and the interfering signal is already filtered out by a system anti-aliasing filter before being calculated by the ACB Engine, the network element NE2 sends a signal to the network element NE1 by using the Link A, and the interfering signal in the signal is filtered out by the system anti-aliasing filter; therefore, when the bandwidth is switched to 500 M, a bandwidth of the system anti-aliasing filter is also accordingly extended, and in this case, the interfering signal is in a passband of the system anti-aliasing filter and cannot be restricted by a system, thereby resulting in link interruption due to excessively large interference, and repeated ACB switching affects normal service transmission and link availability.

SUMMARY

Embodiments of the present invention provide a channel bandwidth switching method, aiming to solve a problem of how to prevent interruption of a link or a bit error from occurrence when an interfering signal affects switching of an operating bandwidth in an ascending order.

According to a first aspect, a channel bandwidth switching method is provided, where the method includes:

acquiring, by a first network element, a mean square error MSE, where the MSE is used for identifying channel quality of a first space link from a second network element to the first network element;

acquiring, according to the MSE and a correspondence between a target bandwidth of the first space link and the MSE, the target bandwidth of the first space link;

acquiring a signal, which is received by the first network element, of the second network element in a case in which the target bandwidth of the first space link is greater than an operating bandwidth of the first network element;

acquiring an interfering signal in a case in which the signal has the interfering signal outside the operating bandwidth;

determining, according to the interfering signal and an error-free threshold, whether the operating bandwidth can be switched to the target bandwidth of the first space link; and if it is determined that the operating bandwidth can be switched to the target bandwidth of the first space link, sending information that carries the target bandwidth of the first space link to the second network element, so that a channel bandwidth of the first space link is switched from the operating bandwidth to the target bandwidth of the first space link.

With reference to the first aspect, in a first possible implementation manner of the first aspect, the acquiring an interfering signal in a case in which the signal has the interfering signal outside the operating bandwidth includes:

making, by the first network element, the signal sequentially pass through a band-pass filter having a same target bandwidth value as that of the first space link, and a band-stop filter having a same operating bandwidth value as that of the first network element, to acquire the interfering signal.

With reference to the first aspect, in a second possible implementation manner of the first aspect, the acquiring an interfering signal in a case in which the signal has the interfering signal outside the operating bandwidth includes:

dividing, by the first network element, the signal into two signals, where one signal passes through a band-pass filter having a same target bandwidth value as that of the first space link to acquire a second signal, and the other signal passes through a band-pass filter having a same value as the operating bandwidth to acquire a third signal; and acquiring the interfering signal according to the second signal and the third signal.

With reference to the first aspect, in a third possible implementation manner of the first aspect, the determining, according to the interfering signal and an error-free threshold, whether the operating bandwidth can be switched to the target bandwidth of the first space link includes:

calculating a signal to noise ratio of the signal within the operating bandwidth;

calculating, according to the signal to noise ratio of the signal within the operating bandwidth, a signal to noise ratio, which is obtained after the operating bandwidth is switched to the target bandwidth of the first space link, of the signal within the operating bandwidth;

calculating a signal to noise ratio, which is obtained after the operating bandwidth is switched to the target bandwidth of the first space link, of the interfering signal; and if the signal to noise ratio, which is obtained after the operating bandwidth is switched to the target bandwidth of the first space link, of the signal within the operating bandwidth is greater than a sum of the signal to noise ratio, which is obtained after the operating bandwidth is switched to the target bandwidth of the first space link, of the interfering signal and a signal to noise ratio of the error-free threshold, determining that the operating bandwidth can be switched to the target bandwidth of the first space link.

With reference to the first aspect, in a fourth possible implementation manner of the first aspect, the determining, according to the interfering signal and an error-free threshold, whether the operating bandwidth can be switched to the target bandwidth of the first space link includes:

acquiring time domain data of the interfering signal by using an inverse Fourier transform IFFT algorithm;

grouping the time domain data, where a first group is from a first piece of time domain data to an $i^{th}$ piece of time domain data, a second group is from a second piece of time domain data to an $(i+1)^{th}$ piece of time domain data, a third group is from a third piece of time domain data to an $(i+2)^{th}$ piece of time domain data, and so on, and an $(n-i+1)^{th}$ group is from an $(n-i+1)^{th}$ piece of time domain data to an $(n+1)^{th}$ piece of data, where n is a quantity of the time domain data, and i is a quantity of domains of time domain data of each group;

calculating a signal power of each group, and averaging signal powers of all the groups to obtain a signal power of the interfering signal; and if the signal power of the interfering signal is less than a power of the error-free threshold, determining that the operating bandwidth can be switched to the target bandwidth of the first space link.

With reference to the first aspect or the first possible implementation manner of the first aspect or the second possible implementation manner of the first aspect or the third possible implementation manner of the first aspect or the fourth possible implementation manner of the first aspect, in a fifth possible implementation manner of the first aspect, the method further includes:

in a case in which the target bandwidth of the first space link is less than the operating bandwidth of the first network element, sending the information that carries the target bandwidth of the first space link to the second network element, so that a channel bandwidth of a space link from the second network element to the first network element is switched from the operating bandwidth to the target bandwidth of the first space link.

With reference to the first aspect or the first possible implementation manner of the first aspect or the second possible implementation manner of the first aspect or the third possible implementation manner of the first aspect or the fourth possible implementation manner of the first aspect or the fifth possible implementation manner of the first aspect, in a sixth possible implementation manner of the first aspect, the method further includes:

if it is determined that the operating bandwidth cannot be switched to the target bandwidth of the first space link, returning to the step of acquiring, by a first network element, an MSE.

According to a second aspect, network equipment is provided, where the network equipment includes:

a first acquiring unit, configured to acquire a mean square error MSE, where the MSE is used for identifying channel quality of a first space link from a second network element to a first network element;

a second acquiring unit, configured to acquire, according to the MSE and a correspondence between a target bandwidth of the first space link and the MSE, the target bandwidth of the first space link;

a third acquiring unit, configured to acquire a signal, which is received by the first network element, of the second network element in a case in which the target bandwidth of the first space link is greater than an operating bandwidth of the first network element;

a fourth acquiring unit, configured to acquire an interfering signal in a case in which the signal has the interfering signal outside the operating bandwidth;

a determining unit, configured to determine, according to the interfering signal and an error-free threshold, whether the operating bandwidth can be switched to the target bandwidth of the first space link; and a sending unit, configured to: if it is determined that the operating bandwidth can be switched to the target bandwidth of the first space link, send information that carries the target bandwidth of the first space link to the second network element, so that a channel bandwidth of the first space link is switched from the operating bandwidth to the target bandwidth of the first space link.

With reference to the second aspect, in a first possible implementation manner of the second aspect, the fourth acquiring unit is specifically configured to:

enable the first network element to make the signal sequentially pass through a band-pass filter having a same target bandwidth value as that of the first space link, and a band-stop filter having a same operating bandwidth value as that of the first network element, to acquire the interfering signal.

With reference to the second aspect, in a second possible implementation manner of the second aspect, the fourth acquiring unit is specifically configured to:

enable the first network element to divide the signal into two signals, where one signal passes through a band-pass filter having a same target bandwidth value as that of the first space link to acquire a second signal, and the other signal passes through a band-pass filter having a same value as the operating bandwidth to acquire a third signal; and acquire the interfering signal according to the second signal and the third signal.

With reference to the second aspect, in a third possible implementation manner of the second aspect, the determining unit is specifically configured to:

calculate a signal to noise ratio of the signal within the operating bandwidth;

calculate, according to the signal to noise ratio of the signal within the operating bandwidth, a signal to noise ratio, which is obtained after the operating bandwidth is switched to the target bandwidth of the first space link, of the signal within the operating bandwidth;

calculate a signal to noise ratio, which is obtained after the operating bandwidth is switched to the target bandwidth of the first space link, of the interfering signal; and if the signal to noise ratio, which is obtained after the operating bandwidth is switched to the target bandwidth of the first space link, of the signal within the operating bandwidth is greater than a sum of the signal to noise ratio, which is obtained after the operating bandwidth is switched to the target bandwidth of the first space link, of the interfering signal and a signal to noise ratio of the error-free threshold, determine that the operating bandwidth can be switched to the target bandwidth of the first space link.

With reference to the second aspect, in a fourth possible implementation manner of the second aspect, the determining unit is specifically configured to:

acquire time domain data of the interfering signal by using an inverse Fourier transform IFFT algorithm;

group the time domain data, where a first group is from a first piece of time domain data to an $i^{th}$ piece of time domain data, a second group is from a second piece of time domain data to an $(i+1)^{th}$ piece of time domain data, a third group is from a third piece of time domain data to an $(i+2)^{th}$, piece of time domain data, and so on, and an $(n-i+1)^{th}$ group is from an $(n-i+1)^{th}$ piece of time domain data to an $(n+1)^{th}$ piece of data, where n is a quantity of the time domain data, and i is a quantity of domains of time domain data of each group;

calculate a signal power of each group, and average signal powers of all the groups to obtain a signal power of the interfering signal; and if the signal power of the interfering signal is less than a power of the error-free threshold, determine that the operating bandwidth can be switched to the target bandwidth of the first space link.

With reference to the second aspect or the first possible implementation manner of the second aspect or the second possible implementation manner of the second aspect or the third possible implementation manner of the second aspect or the fourth possible implementation manner of the second aspect, in a fifth possible implementation manner of the second aspect, the sending unit is further configured to:

in a case in which the target bandwidth of the first space link is less than the operating bandwidth of the first network element, send the information that carries the target bandwidth of the first space link to the second network element, so that a channel bandwidth of a space link from the second network element to the first network element is switched from the operating bandwidth to the target bandwidth of the first space link.

With reference to the second aspect or the first possible implementation manner of the second aspect or the second possible implementation manner of the second aspect or the third possible implementation manner of the second aspect or the fourth possible implementation manner of the second aspect or the fifth possible implementation manner of the second aspect, in a sixth possible implementation manner of the second aspect, the network equipment further includes a processing unit, where the processing unit is specifically configured to:

if it is determined that the operating bandwidth cannot be switched to the target bandwidth of the first space link, return to the step of acquiring, by a first network element, an MSE.

The embodiments of the present invention provide a channel bandwidth switching method. In the method, an MSE is acquired, where the MSE is used for identifying channel quality of a space link from a second network element to a first network element; a target bandwidth of the first space link is acquired according to the MSE and a correspondence between the target bandwidth of the space link and the MSE; in a case in which the target bandwidth of the first space link is greater than an operating bandwidth of the first network element, a signal, which is received by the first network element, of the second network element is acquired; in a case in which the signal has an interfering signal outside the operating bandwidth, the interfering signal is acquired; it is determined, according to the interfering signal and an error-free threshold, whether the operating bandwidth can be switched to the target bandwidth of the first space link; and if it is determined that the operating bandwidth can be switched to the target bandwidth of the first space link, information that carries the target bandwidth of the first space link is sent to the second network element, so that a channel bandwidth of the space link from the second network element to the first network element is switched from the operating bandwidth to the target bandwidth of the first space link, thereby avoiding a problem such as interruption of signal transmission, which is brought when the interfering signal affects switching of the operating bandwidth in an ascending order.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
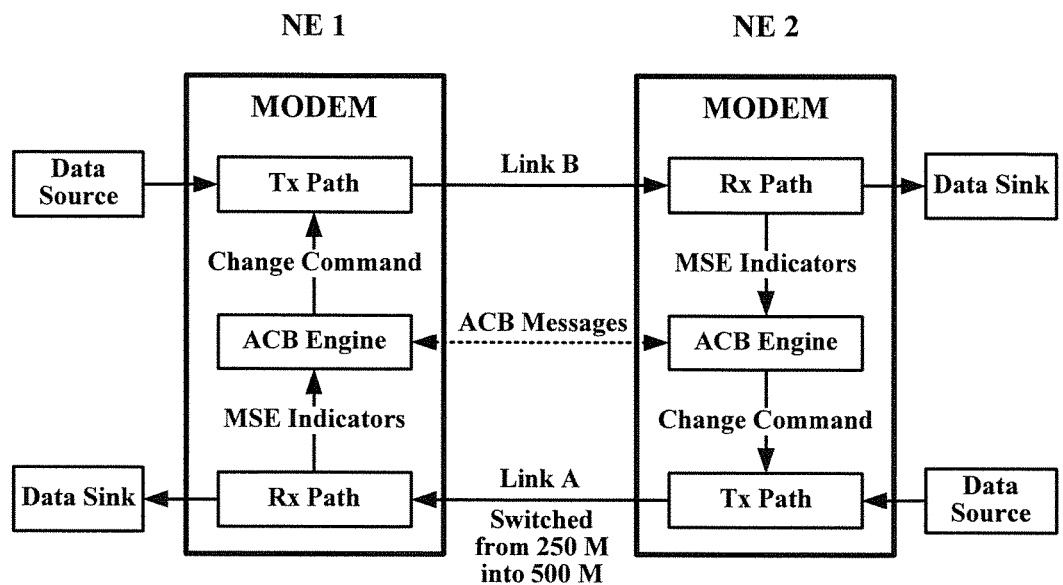
FIG. 1 is a schematic structural diagram of network equipment according to the prior art.
Figure 2:
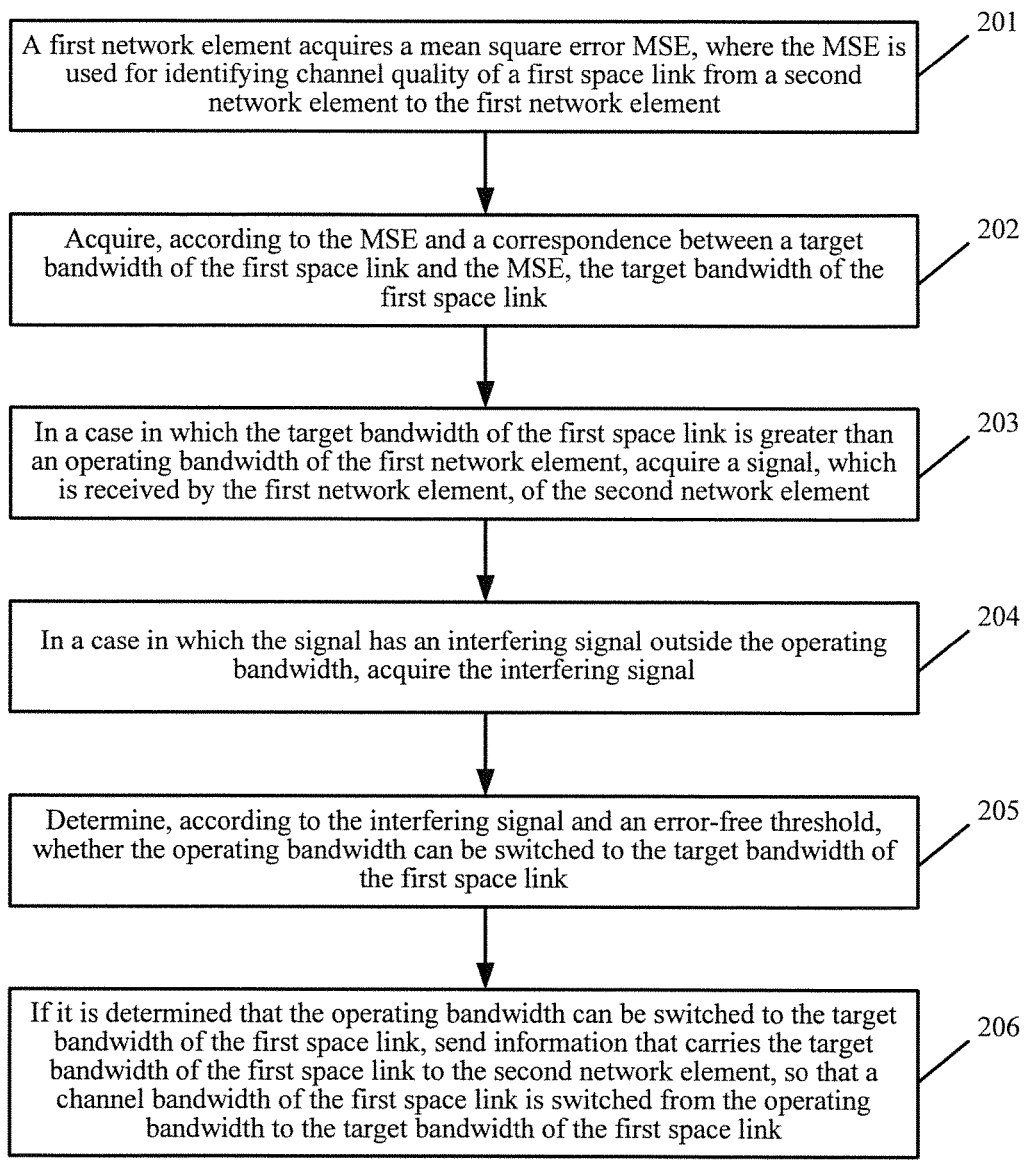
FIG. 2 is a flowchart of a channel bandwidth switching method according to the present invention.

Referring to FIG. 2, FIG. 2 is a flowchart of a channel bandwidth switching method according to an embodiment of the present invention. As shown in FIG. 2, the method includes the following steps:

Step S201: A first network element acquires a mean square error MSE, where the MSE is used for identifying channel quality of a first space link from a second network element to the first network element.

The mean square error (Mean Square Error, MSE) is a mean square error between a constellation point of an actually received signal and a standard constellation point, where the actually received signal is a signal that is sent by the second network element to the first network element after an interfering signal is filtered out.

Step S202: Acquire, according to the MSE and a correspondence between a target bandwidth of the first space link and the MSE, the target bandwidth of the first space link.

Specifically, the correspondence between the MSE and the target bandwidth of the space link is preset, for example, it is set that MSE=1, and the target bandwidth is 500 M; or MSE=2, and the target bandwidth is 250 M; or the like. After acquiring the MSE, the first network element may find the target bandwidth according to the acquired MSE and the preset correspondence.

Step S203: Acquire a signal, which is received by the first network element, of the second network element in a case in which the target bandwidth of the first space link is greater than an operating bandwidth of the first network element.

Figure 3:
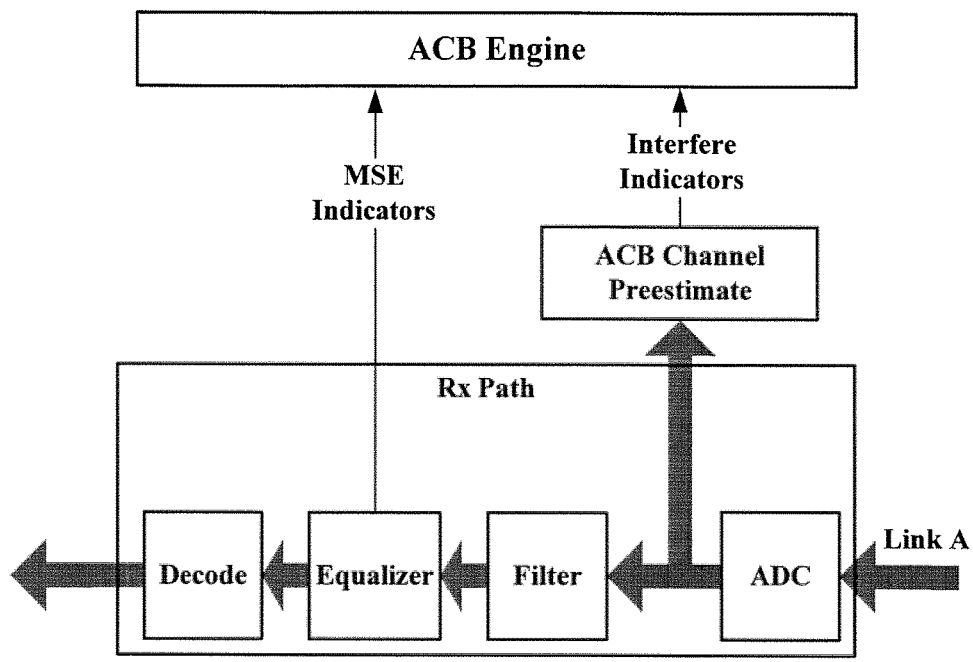
FIG. 3 is a schematic structural diagram of network equipment according to the present invention.

Specifically, assuming that the MSE, which is acquired by the first network element, of the space link from the second network element to the first network element is 2, the first network element finds that the target bandwidth is 500 M according to MSE=2 and the preset correspondence, and acquires the signal sent by the second network element to the first network element, where the signal is a signal that does not pass through a system anti-aliasing filter. Referring to FIG. 3, FIG. 3 is a schematic structural diagram of network equipment according to the present invention. As shown in FIG. 3, the second network element sends a signal to the first network element by using a LinkA, and in the present invention, a signal after being processed by an analog to digital converter (Analog to Digital Converter, ADC) is acquired, while in the prior art, the signal is required to pass through a system anti-aliasing filter and an Equalizer before being analyzed by an ACB Engine.

Figure 4:
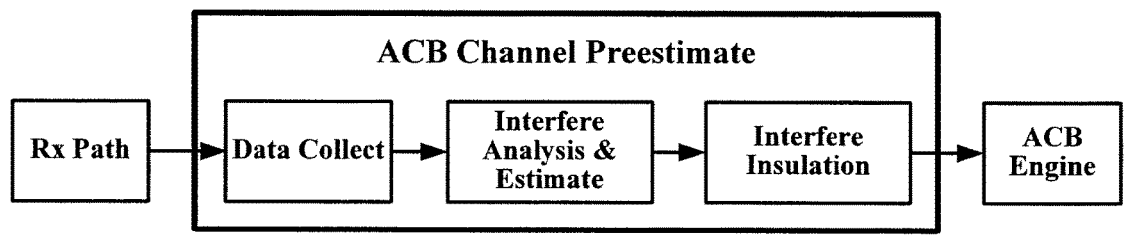
FIG. 4 is a schematic structural diagram of network equipment according to the present invention.

Referring to FIG. 4, FIG. 4 is a schematic structural diagram of network equipment according to the present invention. As shown in FIG. 4, ACB Channel Preestimate includes Data Collect, Interfere Insulation, and Interfere Analysis&Estimate, where the Data Collect is configured to acquire a signal, which is not filtered out by a system anti-aliasing filter, from the second network element to the first network element, the Interfere Insulation is configured to acquire an interfering signal in the signal, and the Interfere Analysis&Estimate is configured to analyze whether the interfering signal results in a problem such as interruption of signal transmission after a bandwidth is switched.

Step S204: Acquire an interfering signal in a case in which the signal has the interfering signal outside the operating bandwidth.

Optionally, the acquiring an interfering signal in a case in which the signal has the interfering signal outside the operating bandwidth includes:

making, by the first network element, the signal sequentially pass through a band-pass filter having a same target bandwidth value as that of the first space link, and a band-stop filter having a same operating bandwidth value as that of the first network element, to acquire the interfering signal.

Figure 5:
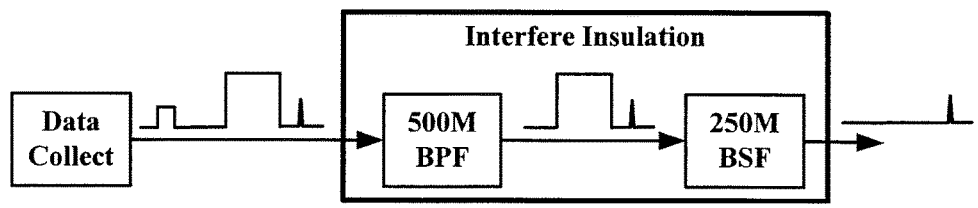
FIG. 5 is a schematic diagram of a method for separating an interfering signal according to the present invention.
Figure 6:
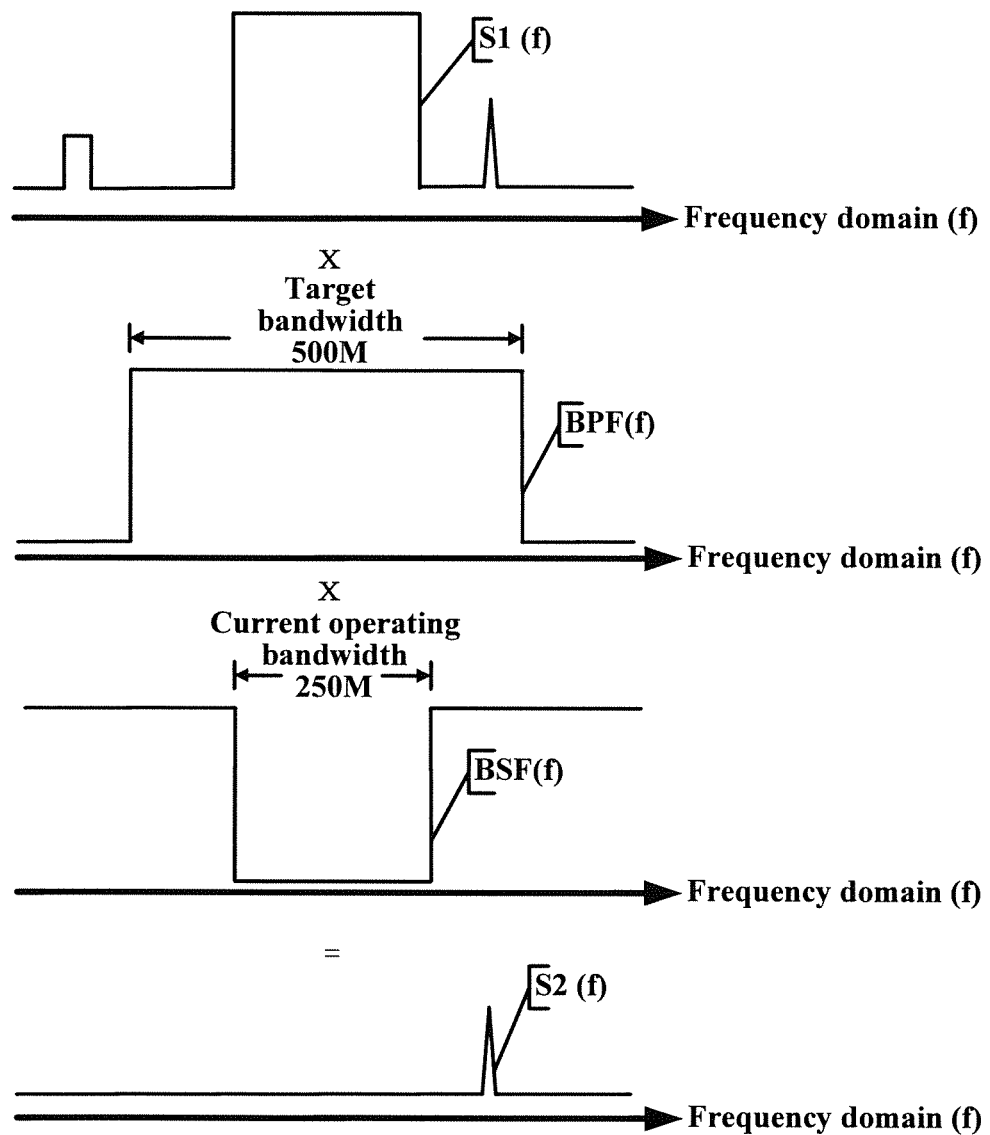
FIG. 6 is a schematic diagram of a method for separating an interfering signal according to the present invention.

Specifically, referring to FIG. 5 and FIG. 6, FIG. 5 is a schematic diagram of a method for separating an interfering signal according to the present invention; and FIG. 6 is a schematic diagram of a method for separating an interfering signal according to the present invention. The signal acquired by the Data Collect is made to sequentially pass through a band-pass filter (Band-Pass Filter, BPF) of 500 M, to acquire a signal within 500 M, and pass through a band-stop filter (Band-Stop Filter, BSF) of 250 M to acquire an interfering signal of 250 M to 500 M.

Optionally, the acquiring an interfering signal in a case in which the signal has the interfering signal outside the operating bandwidth includes:

dividing, by the first network element, the signal into two signals, where one signal passes through a band-pass filter having a same target bandwidth value as that of the first space link to acquire a second signal, and the other signal passes through a band-pass filter having a same value as the operating bandwidth to acquire a third signal; and acquiring the interfering signal according to the second signal and the third signal.

Figure 7:
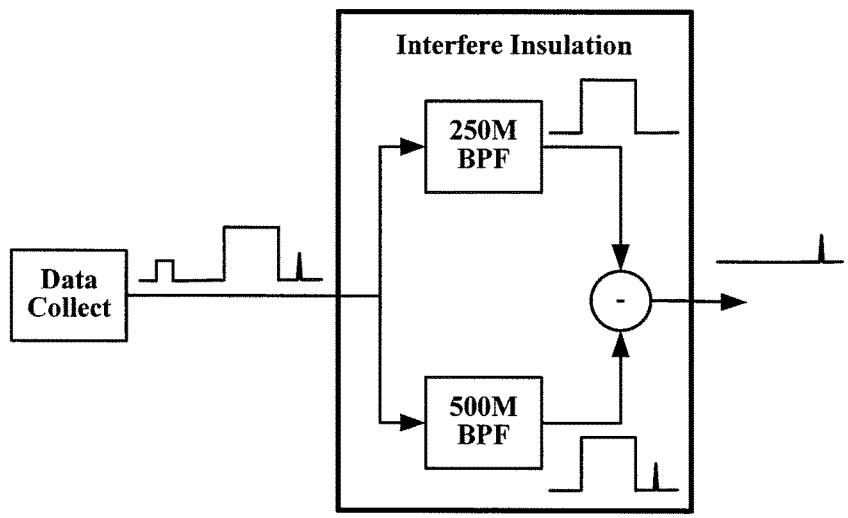
FIG. 7 is a schematic diagram of a method for separating an interfering signal according to the present invention.

Specifically, referring to FIG. 7, FIG. 7 is a schematic diagram of a method for separating an interfering signal according to the present invention. The signal acquired by the Data Collect is divided into two signals, where one signal passes through a BPF of 250 M to acquire a signal outside a bandwidth of 250 M, and the other signal passes through a BPF of 500 M to acquire a signal outside a bandwidth of 500 M. Same parts in the two signals are canceled, and a remaining signal is an interfering signal within a bandwidth of 250 M to 500 M.

Step S205: Determine, according to the interfering signal and an error-free threshold, whether the operating bandwidth can be switched to the target bandwidth of the first space link.

The error-free threshold is a threshold at which a signal can be normally decoded, and which is preset by network equipment, where the threshold may be represented by using a signal to noise ratio, or may be represented by using a power.

Optionally, the determining, according to the interfering signal and an error-free threshold, whether the operating bandwidth can be switched to the target bandwidth of the first space link includes:

calculating a signal to noise ratio of the signal within the operating bandwidth;

calculating, according to the signal to noise ratio of the signal within the operating bandwidth, a signal to noise ratio, which is obtained after the operating bandwidth is switched to the target bandwidth of the first space link, of the signal within the operating bandwidth;

calculating a signal to noise ratio, which is obtained after the operating bandwidth is switched to the target bandwidth of the first space link, of the interfering signal; and if the signal to noise ratio, which is obtained after the operating bandwidth is switched to the target bandwidth of the first space link, of the signal within the operating bandwidth is greater than a sum of the signal to noise ratio, which is obtained after the operating bandwidth is switched to the target bandwidth of the first space link, of the interfering signal and a signal to noise ratio of the error-free threshold, determining that the operating bandwidth can be switched to the target bandwidth of the first space link.

Figure 8:
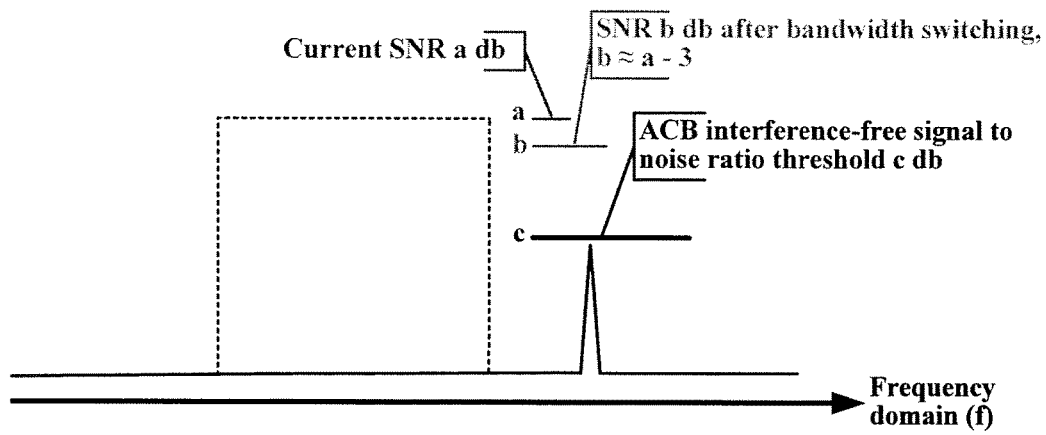
FIG. 8 is a schematic diagram of a method for separating an interfering signal according to the present invention.

Specifically, as shown in FIG. 8, FIG. 8 is a schematic diagram of a method for separating an interfering signal according to the present invention. A signal to noise ratio a of the signal is calculated after the interfering signal is filtered out; when the operating bandwidth is switched to 500 M, a signal to noise ratio b of the signal is calculated after the interfering signal is filtered out, where the signal to noise ratio (Signal Noise Ratio, SNR)=the SNR before switching−10 log 10 (a current symbol rate/a symbol rate before the switching)=the SNR before the switching−3, that is, b≈a−3; and a signal to noise ratio d, after the switching, of the interfering signal is calculated. Assuming that the signal to noise ratio of the error-free threshold is c, and assuming that b is greater than c+d, it is determined that the operating bandwidth can be switched to the target bandwidth. Assuming that b is less than or equal to c+d, it is determined that the operating bandwidth cannot be switched to the target bandwidth.

Optionally, the determining, according to the interfering signal and an error-free threshold, whether the operating bandwidth can be switched to the target bandwidth of the first space link includes:

acquiring time domain data of the interfering signal by using an IFFT algorithm;

grouping the time domain data, where a first group is from a first piece of time domain data to an $i^{th}$ piece of time domain data, a second group is from a second piece of time domain data to an $(i+1)^{th}$ piece of time domain data, a third group is from a third piece of time domain data to an $(i+2)^{th}$ piece of time domain data, and so on, and an $(n-i+1)^{th}$ group is from an $(n-i+1)^{th}$ piece of time domain data to an $(n+1)^{th}$ piece of data;

calculating a signal power of each group, and averaging signal powers of all the groups to obtain a signal power of the interfering signal; and if the signal power of the interfering signal is less than a power of the error-free threshold, determining that the operating bandwidth can be switched to the target bandwidth of the first space link.

Figure 9:
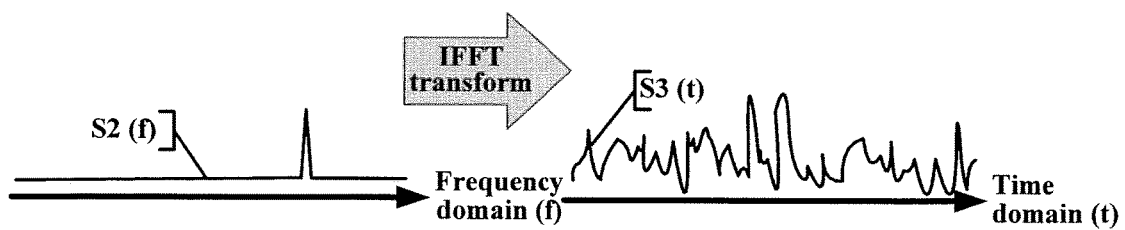
FIG. 9 is a schematic diagram of an inverse Fourier transform method according to the prior art.
Figure 10:
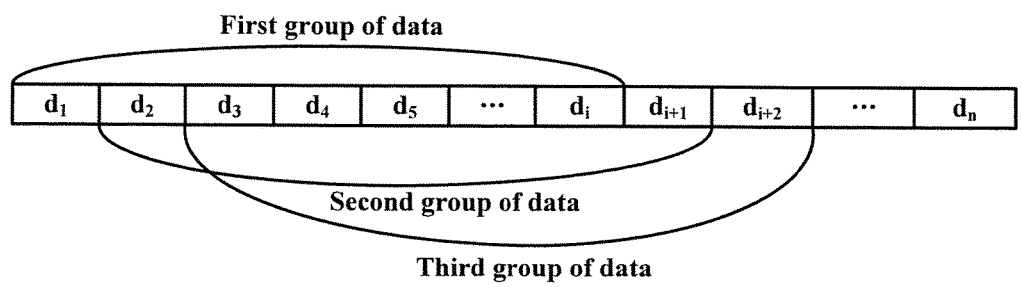
FIG. 10 is a schematic diagram of a method for processing an interfering signal according to the prior art.

Specifically, referring to FIG. 9, FIG. 9 is a schematic diagram of an inverse Fourier transform method according to the prior art. An interfering signal $S2(f)$ is processed by using the inverse Fourier transform (Fourier Inverse Transform, IFFT) algorithm to acquire a time domain signal $S3(t)$. Referring to FIG. 10, FIG. 10 is a schematic diagram of a method for processing an interfering signal according to the prior art. Assuming that $S3(t)$ has n pieces of data, a first group of data is from d1 to di, a second group of data is from d2 to d1+1, and so on; a signal power of the first group of data is calculated according to $P1=(d1)2+(d2)2+(d3)2+ \ldots +(di)2/i$, and so on, and an average signal power of the interfering signal is $P=P1+ \ldots +Pn-i+1/n-i$.

If P is greater than the preset power of the error-free threshold, the operating bandwidth can be switched to the target bandwidth. If P is less than or equal to the preset power of the error-free threshold, the operating bandwidth cannot be switched to the target bandwidth.

Step S206: If it is determined that the operating bandwidth can be switched to the target bandwidth of the first space link, send information that carries the target bandwidth of the first space link to the second network element, so that a channel bandwidth of the space link from the second network element to the first network element is switched from the operating bandwidth to the target bandwidth of the first space link.

As an optional embodiment, the method further includes:

in a case in which the target bandwidth of the first space link is less than the operating bandwidth of the first network element, sending the information that carries the target bandwidth of the first space link to the second network element, so that a channel bandwidth of a space link from the second network element to the first network element is switched from the operating bandwidth to the target bandwidth of the first space link.

Specifically, if the MSE is 2, when it is determined that an operating bandwidth of 500 M can be switched to 250 M, the first network element sends information about a target bandwidth of 250 M to the second network element, so that the second network element and the first network element complete switching of the operating bandwidth from 500 M to 250 M.

As another optional embodiment, the method further includes:

if it is determined that the operating bandwidth cannot be switched to the target bandwidth of the first space link, returning to the step of acquiring, by a first network element, an MSE.

Specifically, if it is determined that after the operating bandwidth is switched from 250 M to 500 M, the interfering signal results in a problem that decoding cannot be performed, the signal is interrupted, or the like, return to step 201, to continue to acquire the MSE.

This embodiment of the present invention provides a channel bandwidth switching method. In the method, an MSE is acquired, where the MSE is used for identifying channel quality of a space link from a second network element to a first network element; a target bandwidth of the first space link is acquired according to the MSE and a correspondence between the target bandwidth of the space link and the MSE; in a case in which the target bandwidth of the first space link is greater than an operating bandwidth of the first network element, a signal, which is received by the first network element, of the second network element is acquired; in a case in which the signal has an interfering signal outside the operating bandwidth, the interfering signal is acquired; it is determined, according to the interfering signal and an error-free threshold, whether the operating bandwidth can be switched to the target bandwidth of the first space link; and if it is determined that the operating bandwidth can be switched to the target bandwidth of the first space link, information that carries the target bandwidth of the first space link is sent to the second network element, so that a channel bandwidth of the space link from the second network element to the first network element is switched from the operating bandwidth to the target bandwidth of the first space link, thereby avoiding a problem such as interruption of signal transmission, which is brought when the interfering signal affects switching of the operating bandwidth in an ascending order.

Figure 11:
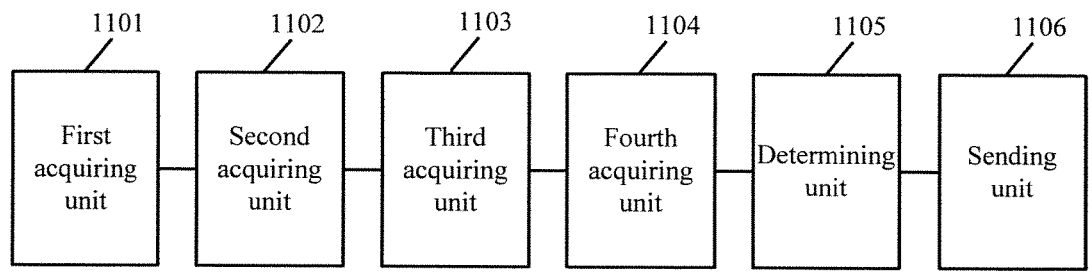
FIG. 11 is a schematic structural diagram of network equipment according to the present invention.

Referring to FIG. 11, FIG. 11 is an apparatus structure diagram of network equipment according to the present invention. As shown in FIG. 11, the network equipment includes the following units:

A first acquiring unit 1101 is configured to acquire a mean square error MSE, where the MSE is used for identifying channel quality of a first space link from a second network element to a first network element.

The MSE is a mean square error between a constellation point of an actually received signal and a standard constellation point, where the actually received signal that is a signal sent by the second network element to the first network element after an interfering signal is filtered out.

A second acquiring unit 1102 is configured to acquire, according to the MSE and a correspondence between a target bandwidth of the first space link and the MSE, the target bandwidth of the first space link.

Specifically, the correspondence between the MSE and the target bandwidth of the space link is preset, for example, it is set that MSE=1, and the target bandwidth is 500 M; or MSE=2, and the target bandwidth is 250 M; or the like. After acquiring the MSE, the first network element may find the target bandwidth according to the acquired MSE and the preset correspondence.

A third acquiring unit 1103 is configured to acquire a signal, which is received by the first network element, of the second network element in a case in which the target bandwidth of the first space link is greater than an operating bandwidth of the first network element.

Specifically, assuming that the MSE, which is acquired by the first network element, of the space link from the second network element to the first network element is 2, the first network element finds that the target bandwidth is 500 M according to MSE=2 and the preset correspondence, and acquires the signal sent by the second network element to the first network element, where the signal is a signal that does not pass through a system anti-aliasing filter. Referring to FIG. 3, FIG. 3 is a schematic structural diagram of network equipment according to the present invention. As shown in FIG. 3, the second network element sends a signal to the first network element by using a LinkA, and in the present invention, a signal after being processed by an analog to digital converter (Analog to Digital Converter, ADC) is acquired, while in the prior art, the signal needs to pass through a system anti-aliasing filter and an Equalizer before being analyzed by an ACB Engine.

Referring to FIG. 4, FIG. 4 is a schematic structural diagram of network equipment according to the present invention. As shown in FIG. 4, ACB Channel Preestimate includes Data Collect, Interfere Insulation, and Interfere Analysis&Estimate, where the Data Collect is configured to acquire a signal, which is not filtered out by a system anti-aliasing filter, from the second network element to the first network element, the Interfere Insulation is configured to acquire an interfering signal in the signal, and the Interfere Analysis&Estimate is configured to analyze whether the interfering signal results in a problem such as interruption of signal transmission after a bandwidth is switched.

A fourth acquiring unit 1104 is configured to acquire an interfering signal in a case in which the signal has the interfering signal outside the operating bandwidth.

Optionally, the fourth acquiring unit 1104 is specifically configured to:

enable the first network element to make the signal sequentially pass through a band-pass filter having a same target bandwidth value as that of the first space link, and a band-stop filter having a same operating bandwidth value as that of the first network element, to acquire the interfering signal.

Specifically, referring to FIG. 5 and FIG. 6, the signal acquired by the Data Collect is made to sequentially pass through a band-pass filter (Band-Pass Filter, BPF) of 500 M, to acquire a signal within 500 M, and pass through a band-stop filter (Band-Stop Filter, BSF) of 250 M to acquire an interfering signal of 250 M to 500 M.

Optionally, the fourth acquiring unit 1104 is specifically configured to:

enable the first network element to divide the signal into two signals, where one signal passes through a band-pass filter having a same target bandwidth value as that of the first space link to acquire a second signal, and the other signal passes through a band-pass filter having a same value as the operating bandwidth to acquire a third signal; and acquire the interfering signal according to the second signal and the third signal.

Specifically, referring to FIG. 7, the signal acquired by the Data Collect is divided into two signals, where one signal passes through a BPF of 250 M to acquire a signal outside a bandwidth of 250 M, and the other signal passes through a BPF of 500 M to acquire a signal outside a bandwidth of 500 M. Same parts in the two signals are canceled, and a rest signal is an interfering signal within a bandwidth of 250 M to 500 M.

A determining unit 1105 is configured to determine, according to the interfering signal and an error-free threshold, whether the operating bandwidth can be switched to the target bandwidth of the first space link, where the error-free threshold is a threshold at which a signal can be normally decoded, and which is preset by network equipment, where the threshold may be represented by using a signal to noise ratio, or may be represented by using a power.

Optionally, the determining unit 1105 is specifically configured to:

calculate a signal to noise ratio of the signal within the operating bandwidth;

calculate, according to the signal to noise ratio of the signal within the operating bandwidth, a signal to noise ratio, which is obtained after the operating bandwidth is switched to the target bandwidth of the first space link, of the signal within the operating bandwidth;

calculate a signal to noise ratio, which is obtained after the operating bandwidth is switched to the target bandwidth of the first space link, of the interfering signal; and if the signal to noise ratio, which is obtained after the operating bandwidth is switched to the target bandwidth of the first space link, of the signal within the operating bandwidth is greater than a sum of the signal to noise ratio, which is obtained after the operating bandwidth is switched to the target bandwidth of the first space link, of the interfering signal and a signal to noise ratio of the error-free threshold, determine that the operating bandwidth can be switched to the target bandwidth of the first space link.

Specifically, as shown in FIG. 8, A signal to noise ratio a of the signal is calculated after the interfering signal is filtered out; when the operating bandwidth is switched to 500 M, a signal to noise ratio b of the signal is calculated after the interfering signal is filtered out, where the signal to noise ratio (Signal Noise Ratio, SNR)=the SNR before switching−10 log 10 (a current symbol rate/a symbol rate before the switching)=the SNR before the switching−3, that is, b≈a−3; and a signal to noise ratio d, after the switching, of the interfering signal is calculated. Assuming that the signal to noise ratio of the error-free threshold is c, and assuming that b is greater than c+d, it is determined that the operating bandwidth can be switched to the target bandwidth. Assuming that b is less than or equal to c+d, it is determined that the operating bandwidth cannot be switched to the target bandwidth.

Optionally, the determining unit 1105 is specifically configured to:

acquire time domain data of the interfering signal by using an inverse Fourier transform IFFT algorithm;

group the time domain data, where a first group is from a first piece of time domain data to an $i^{th}$ piece of time domain data, a second group is from a second piece of time domain data to an $(i+1)^{th}$ piece of time domain data, a third group is from a third piece of time domain data to an $(i+2)^{th}$ piece of time domain data, and so on, and an $(n-i+1)^{th}$ group is from an $(n-i+1)^{th}$ piece of time domain data to an $(n+1)^{th}$ piece of data, where n is a quantity of the time domain data, and i is a quantity of domains of time domain data of each group;

calculate a signal power of each group, and average signal powers of all the groups to obtain a signal power of the interfering signal; and if the signal power of the interfering signal is less than a power of the error-free threshold, determine that the operating bandwidth can be switched to the target bandwidth of the first space link.

Specifically, referring to FIG. 9, an interfering signal $S2(f)$ is processed by using the inverse Fourier transform (Fourier Inverse Transform, IFFT) algorithm to acquire a time domain signal $S3(t)$. Referring to FIG. 10, assuming that $S3(t)$ has n pieces of data, a first group of data is from d1 to di, a second group of data is from d2 to d1+1, and so on; a signal power of the first group of data is calculated according to $P1=(d1)2+(d2)2+(d3)2+ \ldots +(di)2/i$, and so on, and an average signal power of the interfering signal is $P=P1+ \ldots +Pn-i+1/n-i$.

If P is greater than the preset power of the error-free threshold, the operating bandwidth can be switched to the target bandwidth. If P is less than or equal to the preset power of the error-free threshold, the operating bandwidth cannot be switched to the target bandwidth.

A sending unit 1106 is configured to: if it is determined that the operating bandwidth can be switched to the target bandwidth of the first space link, send information that carries the target bandwidth of the first space link to the second network element, so that a channel bandwidth of the first space link is switched from the operating bandwidth to the target bandwidth of the first space link.

As an optional embodiment, the sending unit 1106 is further configured to:

in a case in which the target bandwidth of the first space link is less than the operating bandwidth of the first network element, send the information that carries the target bandwidth of the first space link to the second network element, so that a channel bandwidth of a space link from the second network element to the first network element is switched from the operating bandwidth to the target bandwidth of the first space link.

Specifically, if the MSE is 2, when it is determined that an operating bandwidth of 500 M can be switched to 250 M, the first network element sends information about a target bandwidth of 250 M to the second network element, so that the second network element and the first network element complete switching of the operating bandwidth from 500 M to 250 M.

As another optional embodiment, the network equipment further includes a processing unit, where the processing unit is specifically configured to:

if it is determined that the operating bandwidth cannot be switched to the target bandwidth of the first space link, return to the step of acquiring, by a first network element, an MSE.

Specifically, if it is determined that after the operating bandwidth is switched from 250 M to 500 M, the interfering signal results in a problem that decoding cannot be performed, the signal is interrupted, or the like, return to step 201, to continue to acquire the MSE.

This embodiment of the present invention provides network equipment. An MSE is acquired, where the MSE is used for identifying channel quality of a space link from a second network element to a first network element; a target bandwidth of the first space link is acquired according to the MSE and a correspondence between the target bandwidth of the space link and the MSE; in a case in which the target bandwidth of the first space link is greater than an operating bandwidth of the first network element, a signal, which is received by the first network element, of the second network element is acquired; in a case in which the signal has an interfering signal outside the operating bandwidth, the interfering signal is acquired; it is determined, according to the interfering signal and an error-free threshold, whether the operating bandwidth can be switched to the target bandwidth of the first space link; and if it is determined that the operating bandwidth can be switched to the target bandwidth of the first space link, information that carries the target bandwidth of the first space link is sent to the second network element, so that a channel bandwidth of the space link from the second network element to the first network element is switched from the operating bandwidth to the target bandwidth of the first space link, thereby avoiding a problem such as interruption of signal transmission, which is brought when the interfering signal affects switching of the operating bandwidth in an ascending order.

Figure 12:
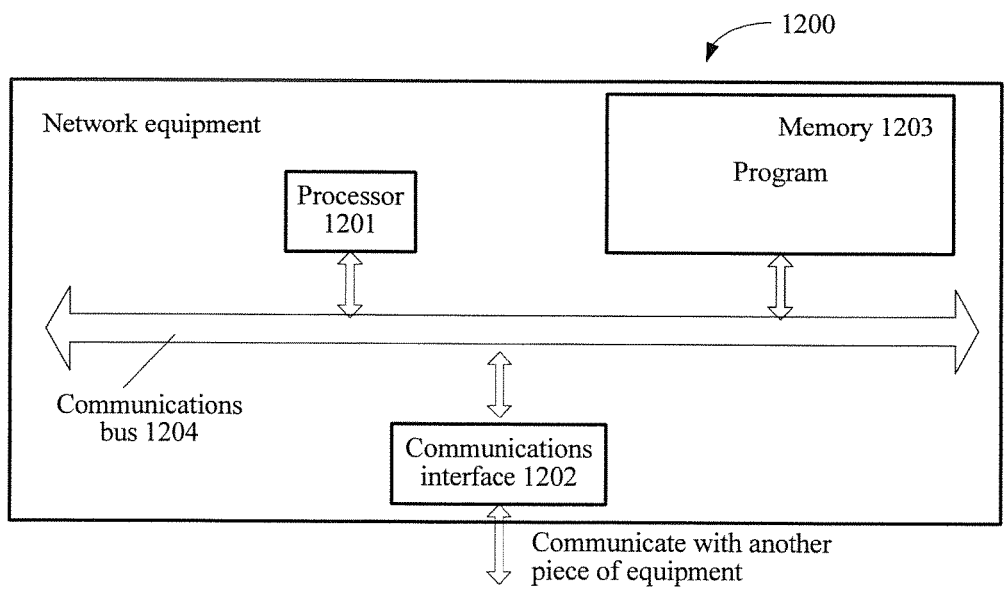
FIG. 12 is a schematic structural diagram of network equipment according to the present invention.

Referring to FIG. 12, FIG. 12 is a schematic structural diagram of network equipment according to the present invention. FIG. 12 shows network equipment 1200 provided in this embodiment of the present invention, and specific implementation of the network equipment is not limited in the specific embodiment of the present invention. The network equipment 1200 includes:

a processor (processor) 1201, a communications interface (Communications Interface) 1202, a memory (memory) 1203, and a bus 1204.

The processor 1201, the communications interface 1202, and the memory 1203 complete communication between each other by using the bus 1204.

The communications interface 1202 is configured to communicate with another piece of network equipment.

The processor 1201 is configured to execute a program.

Specifically, the program may include program code, where the program code includes a computer operation instruction.

The processor 1201 may be a central processing unit (central processing unit, CPU), or an application specific integrated circuit ASIC (Application Specific Integrated Circuit), or one or more integrated circuits configured to implement this embodiment of the present invention.

The memory 1203 is configured to store the program. The memory 1203 may be a volatile memory (volatile memory)

such as a random-access memory (random-access memory, RAM), or a non-volatile memory (non-volatile memory) such as a read-only memory (read-only memory, ROM), a flash memory (flash memory), a hard disk drive (hard disk drive, HDD), or a solid-state drive (solid-state drive, SSD). The processor 1201 performs the following method according to a program instruction stored in the memory 1203:

acquiring, by a first network element, a mean square error MSE, where the MSE is used for identifying channel quality of a first space link from a second network element to the first network element;

acquiring, according to the MSE and a correspondence between a target bandwidth of the first space link and the MSE, the target bandwidth of the first space link;

acquiring a signal, which is received by the first network element, of the second network element in a case in which the target bandwidth of the first space link is greater than an operating bandwidth of the first network element;

acquiring an interfering signal in a case in which the signal has the interfering signal outside the operating bandwidth;

determining, according to the interfering signal and an error-free threshold, whether the operating bandwidth can be switched to the target bandwidth of the first space link; and if it is determined that the operating bandwidth can be switched to the target bandwidth of the first space link, sending information that carries the target bandwidth of the first space link to the second network element, so that a channel bandwidth of the first space link is switched from the operating bandwidth to the target bandwidth of the first space link.

The acquiring an interfering signal in a case in which the signal has the interfering signal outside the operating bandwidth includes:

making, by the first network element, the signal sequentially pass through a band-pass filter having a same target bandwidth value as that of the first space link, and a band-stop filter having a same operating bandwidth value as that of the first network element, to acquire the interfering signal.

The acquiring an interfering signal in a case in which the signal has the interfering signal outside the operating bandwidth includes:

dividing, by the first network element, the signal into two signals, where one signal passes through a band-pass filter having a same target bandwidth value as that of the first space link to acquire a second signal, and the other signal passes through a band-pass filter having a same value as the operating bandwidth to acquire a third signal; and acquiring the interfering signal according to the second signal and the third signal.

The determining, according to the interfering signal and an error-free threshold, whether the operating bandwidth can be switched to the target bandwidth of the first space link includes:

calculating a signal to noise ratio of the signal within the operating bandwidth;

calculating, according to the signal to noise ratio of the signal within the operating bandwidth, a signal to noise ratio, which is obtained after the operating bandwidth is switched to the target bandwidth of the first space link, of the signal within the operating bandwidth;

calculating a signal to noise ratio, which is obtained after the operating bandwidth is switched to the target bandwidth of the first space link, of the interfering signal; and if the signal to noise ratio, which is obtained after the operating bandwidth is switched to the target bandwidth of the first space link, of the signal within the operating bandwidth is greater than a sum of the signal to noise ratio, which is obtained after the operating bandwidth is switched to the target bandwidth of the first space link, of the interfering signal and a signal to noise ratio of the error-free threshold, determining that the operating bandwidth can be switched to the target bandwidth of the first space link.

The determining, according to the interfering signal and an error-free threshold, whether the operating bandwidth can be switched to the target bandwidth of the first space link includes:

acquiring time domain data of the interfering signal by using an inverse Fourier transform IFFT algorithm;

grouping the time domain data, where a first group is from a first piece of time domain data to an $i^{th}$ piece of time domain data, a second group is from a second piece of time domain data to an $(i+1)^{th}$ piece of time domain data, a third group is from a third piece of time domain data to an $(i+2)^{th}$ piece of time domain data, and so on, and an $(n-i+1)^{th}$ group is from an $(n-i+1)^{th}$ piece of time domain data to an $(n+1)^{th}$ piece of data, where n is a quantity of the time domain data, and i is a quantity of domains of time domain data of each group;

calculating a signal power of each group, and averaging signal powers of all the groups to obtain a signal power of the interfering signal; and if the signal power of the interfering signal is less than a power of the error-free threshold, determining that the operating bandwidth can be switched to the target bandwidth of the first space link.

The method further includes:

in a case in which the target bandwidth of the first space link is less than the operating bandwidth of the first network element, sending the information that carries the target bandwidth of the first space link to the second network element, so that a channel bandwidth of a space link from the second network element to the first network element is switched from the operating bandwidth to the target bandwidth of the first space link.

The method further includes:

if it is determined that the operating bandwidth cannot be switched to the target bandwidth of the first space link, returning to the step of acquiring, by a first network element, an MSE.

This embodiment of the present invention provides a channel bandwidth switching method. In the method, an MSE is acquired, where the MSE is used for identifying channel quality of a space link from a second network element to a first network element; a target bandwidth of the first space link is acquired according to the MSE and a correspondence between the target bandwidth of the space link and the MSE; in a case in which the target bandwidth of the first space link is greater than an operating bandwidth of the first network element, a signal, which is received by the first network element, of the second network element is acquired; in a case in which the signal has an interfering signal outside the operating bandwidth, the interfering signal is acquired; it is determined, according to the interfering signal and an error-free threshold, whether the operating bandwidth can be switched to the target bandwidth of the first space link; and if it is determined that the operating bandwidth can be switched to the target bandwidth of the first space link, information that carries the target bandwidth of the first space link is sent to the second network element, so that a channel bandwidth of the space link from the second network element to the first network element is switched from the operating bandwidth to the target bandwidth of the first space link, thereby avoiding a problem such as interruption of signal transmission, which is brought when the interfering signal affects switching of the operating bandwidth in an ascending order.

The foregoing descriptions are merely exemplary implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A channel bandwidth switching method, comprising:
  acquiring, by a first network element, a mean square error (MSE) used for identifying channel quality of a first space link from a second network element to the first network element;
  acquiring, according to the MSE and a correspondence between a target bandwidth of the first space link and the MSE, the target bandwidth of the first space link;
  acquiring a signal, which is received by the first network element, of the second network element in a case in which the target bandwidth of the first space link is greater than an operating bandwidth of the first network element;
  acquiring an interfering signal in a case in which the signal has the interfering signal outside the operating bandwidth;
  determining, according to the interfering signal and an error-free threshold, whether the operating bandwidth can be switched to the target bandwidth of the first space link; and
  if it is determined that the operating bandwidth can be switched to the target bandwidth of the first space link, sending information that carries the target bandwidth of the first space link to the second network element, so that a channel bandwidth of the first space link is switched from the operating bandwidth to the target bandwidth of the first space link.

2. The method according to claim 1, wherein acquiring an interfering signal in a case in which the signal has the interfering signal outside the operating bandwidth comprises:
  making, by the first network element, the signal sequentially pass through a band-pass filter having a same target bandwidth value as that of the first space link, and a band-stop filter having a same operating bandwidth value as that of the first network element, to acquire the interfering signal.

3. The method according to claim 1, wherein acquiring an interfering signal in a case in which the signal has the interfering signal outside the operating bandwidth comprises:
  dividing, by the first network element, the signal into two signals, wherein one signal passes through a band-pass filter having a same target bandwidth value as that of the first space link to acquire a second signal, and the other signal passes through a band-pass filter having a same value as the operating bandwidth to acquire a third signal; and
  acquiring the interfering signal according to the second signal and the third signal.

4. The method according to claim 1, wherein determining, according to the interfering signal and an error-free threshold, whether the operating bandwidth can be switched to the target bandwidth of the first space link comprises:
  calculating a signal to noise ratio of the signal within the operating bandwidth;
  calculating, according to the signal to noise ratio of the signal within the operating bandwidth, a signal to noise ratio, which is obtained after the operating bandwidth is switched to the target bandwidth of the first space link, of the signal within the operating bandwidth;
  calculating a signal to noise ratio, which is obtained after the operating bandwidth is switched to the target bandwidth of the first space link, of the interfering signal; and
  if the signal to noise ratio, which is obtained after the operating bandwidth is switched to the target bandwidth of the first space link, of the signal within the operating bandwidth is greater than a sum of the signal to noise ratio, which is obtained after the operating bandwidth is switched to the target bandwidth of the first space link, of the interfering signal and a signal to noise ratio of the error-free threshold, determining that the operating bandwidth can be switched to the target bandwidth of the first space link.

5. The method according to claim 1, wherein determining, according to the interfering signal and an error-free threshold, whether the operating bandwidth can be switched to the target bandwidth of the first space link comprises:
  acquiring time domain data of the interfering signal by using an inverse Fourier transform IFFT algorithm;
  grouping the time domain data, wherein a first group is from a first piece of time domain data to an $i^{th}$ piece of time domain data, a second group is from a second piece of time domain data to an $(i+1)^{th}$ piece of time domain data, a third group is from a third piece of time domain data to an $(i+2)^{th}$ piece of time domain data, and so on, and an $(n-i+1)^{th}$ group is from an $(n-i+1)^{th}$ piece of time domain data to an $(n+1)^{th}$ piece of time domain data, wherein n is a quantity of the time domain data, and i is a quantity of time domain data of each group;
  calculating a signal power of each group, and averaging signal powers of all the groups to obtain a signal power of the interfering signal; and
  if the signal power of the interfering signal is less than a power of the error-free threshold, determining that the operating bandwidth can be switched to the target bandwidth of the first space link.

6. The method according to claim 1, further comprising:
  in a case in which the target bandwidth of the first space link is less than the operating bandwidth of the first network element, sending the information that carries the target bandwidth of the first space link to the second network element, so that the channel bandwidth of the first space link from the second network element to the first network element is switched from the operating bandwidth to the target bandwidth of the first space link.

7. The method according to claim 1, further comprising:
  if it is determined that the operating bandwidth cannot be switched to the target bandwidth of the first space link, returning to the step of acquiring, by a first network element, an MSE.

8. Network equipment, comprising:
  a first acquiring unit, configured to acquire a mean square error (MSE) used for identifying channel quality of a first space link from a second network element to a first network element;

a second acquiring unit, configured to acquire, according to the MSE and a correspondence between a target bandwidth of the first space link and the MSE, the target bandwidth of the first space link;

a third acquiring unit, configured to acquire a signal, which is received by the first network element, of the second network element in a case in which the target bandwidth of the first space link is greater than an operating bandwidth of the first network element;

a fourth acquiring unit, configured to acquire an interfering signal in a case in which the signal has the interfering signal outside the operating bandwidth;

a determining unit, configured to determine, according to the interfering signal and an error-free threshold, whether the operating bandwidth can be switched to the target bandwidth of the first space link; and a sending unit, configured to: if it is determined that the operating bandwidth can be switched to the target bandwidth of the first space link, send information that carries the target bandwidth of the first space link to the second network element, so that a channel bandwidth of the first space link is switched from the operating bandwidth to the target bandwidth of the first space link.

9. The network equipment according to claim 8, wherein the fourth acquiring unit is configured to:

enable the first network element to make the signal sequentially pass through a band-pass filter having a same target bandwidth value as that of the first space link, and a band-stop filter having a same operating bandwidth value as that of the first network element, to acquire the interfering signal.

10. The network equipment according to claim 8, wherein the fourth acquiring unit is configured to:

enable the first network element to divide the signal into two signals, wherein one signal passes through a band-pass filter having a same target bandwidth value as that of the first space link to acquire a second signal, and the other signal passes through a band-pass filter having a same value as the operating bandwidth to acquire a third signal; and acquire the interfering signal according to the second signal and the third signal.

11. The network equipment according to claim 8, wherein the determining unit is configured to:

calculate a signal to noise ratio of the signal within the operating bandwidth;

calculate, according to the signal to noise ratio of the signal within the operating bandwidth, a signal to noise ratio, which is obtained after the operating bandwidth is switched to the target bandwidth of the first space link, of the signal within the operating bandwidth;

calculate a signal to noise ratio, which is obtained after the operating bandwidth is switched to the target bandwidth of the first space link, of the interfering signal; and if the signal to noise ratio, which is obtained after the operating bandwidth is switched to the target bandwidth of the first space link, of the signal within the operating bandwidth is greater than a sum of the signal to noise ratio, which is obtained after the operating bandwidth is switched to the target bandwidth of the first space link, of the interfering signal and a signal to noise ratio of the error-free threshold, determine that the operating bandwidth can be switched to the target bandwidth of the first space link.

12. The network equipment according to claim 8, wherein the determining unit is configured to:

acquire time domain data of the interfering signal by using an inverse Fourier transform (IFFT) algorithm;

group the time domain data, wherein a first group is from a first piece of time domain data to an $i^{th}$ piece of time domain data, a second group is from a second piece of time domain data to an $(i+1)^{th}$ piece of time domain data, a third group is from a third piece of time domain data to an $(i+2)^{th}$ piece of time domain data, and so on, and an $(n-i+1)^{th}$ group is from an $(n-i+1)^{th}$ piece of time domain data to an $(n+1)^{th}$ piece of data, wherein n is a quantity of the time domain data, and i is a quantity of domains of time domain data of each group;

calculate a signal power of each group, and average signal powers of all the groups to obtain a signal power of the interfering signal; and if the signal power of the interfering signal is less than a power of the error-free threshold, determine that the operating bandwidth can be switched to the target bandwidth of the first space link.

13. The network equipment according to claim 8, wherein the sending unit is further configured to:

in a case in which the target bandwidth of the first space link is less than the operating bandwidth of the first network element, send the information that carries the target bandwidth of the first space link to the second network element, so that a channel bandwidth of a space link from the second network element to the first network element is switched from the operating bandwidth to the target bandwidth of the first space link.

14. The network equipment according to claim 8, further comprising:

a processing unit configured to: if it is determined that the operating bandwidth cannot be switched to the target bandwidth of the first space link, return to the step of acquiring, by a first acquiring unit, an MSE.

\* \* \* \* \*